(12) United States Patent
Shen

(10) Patent No.: US 11,503,578 B2
(45) Date of Patent: Nov. 15, 2022

(54) RESOURCE CONFIGURATION METHOD AND DEVICE, AND COMPUTER STORAGE MEDIUM

(71) Applicant: GUANGDONG OPPO MOBILE TELECOMMUNICATIONS CORP., LTD., Guangdong (CN)

(72) Inventor: Jia Shen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 44 days.

(21) Appl. No.: 16/986,689

(22) Filed: Aug. 6, 2020

(65) Prior Publication Data

US 2020/0367219 A1 Nov. 19, 2020

Related U.S. Application Data

(63) Continuation of application No. PCT/CN2018/075838, filed on Feb. 8, 2018.

(51) Int. Cl.
*H04W 72/04* (2009.01)

(52) U.S. Cl.
CPC ............................... *H04W 72/042* (2013.01)

(58) Field of Classification Search
CPC ............. H04W 74/006; H04W 72/042; H04W 74/0841; H04W 72/04; H04W 48/08; H04W 24/08; H04W 72/1289
See application file for complete search history.

(56) References Cited

U.S. PATENT DOCUMENTS

| 10,736,091 | B2 | 8/2020 | Noh |
| 11,343,063 | B2 | 5/2022 | Takeda |
| 2012/0113939 | A1 | 5/2012 | Kim |
| 2019/0052432 | A1 | 2/2019 | Islam et al. |
| 2019/0059078 | A1 | 2/2019 | Noh et al. |
| 2019/0103943 | A1* | 4/2019 | Wang ............... H04L 1/1854 |
| 2019/0103954 | A1 | 4/2019 | Lee et al. |

(Continued)

FOREIGN PATENT DOCUMENTS

| CN | 102149208 A | 8/2011 |
| CN | 104168605 A | 11/2014 |

(Continued)

OTHER PUBLICATIONS

3GPP TS 38.213 V15.0.0 (Dec. 2017). 3rd Generation Partnership Project; Technical Specification Group Radio Access Network; NR; Physical layer procedures for control (Release 15).

(Continued)

*Primary Examiner* — Chi Ho A Lee
*Assistant Examiner* — Andrew Lee

(57) ABSTRACT

A method and device for resource configuration are provided. In the method: a terminal receiving first control information sent by a network device, a bandwidth part (BWP) currently activated by the terminal being a first BWP, the first control information comprising first indication information, the first indication information indicating that the BWP to be activated is a second BWP; and the terminal determining whether both of the first BWP and the second BWP can be activated at the same time, and if so, the terminal activating the second BWP while keeping the first BWP to be in an activated state.

17 Claims, 9 Drawing Sheets

A network device sends first control information to a terminal, a BWP presently activated by the terminal being a first BWP, the first control information including first indication information, and the first indication information being used to indicate that a BWP to-be-activated is a second BWP, so that when determining that the first BWP and the second BWP are able to be activated simultaneously, the terminal keeps the first BWP to be continuously in an activated state during activating the second BWP

301

(56) References Cited

U.S. PATENT DOCUMENTS

| | | | |
|---|---|---|---|
| 2019/0104517 A1 | 4/2019 | Park | |
| 2019/0141742 A1 | 5/2019 | Zhou | |
| 2019/0150064 A1 | 5/2019 | Sun et al. | |
| 2020/0059345 A1* | 2/2020 | Pelletier | H04W 74/006 |
| 2020/0077432 A1 | 3/2020 | Xiong et al. | |
| 2020/0178144 A1* | 6/2020 | Zhou | H04W 24/08 |
| 2020/0178252 A1 | 6/2020 | Li et al. | |
| 2020/0196285 A1 | 6/2020 | Zhuang et al. | |
| 2020/0205134 A1 | 6/2020 | Pan et al. | |
| 2020/0213066 A1 | 7/2020 | Ma et al. | |
| 2020/0228287 A1* | 7/2020 | Lou | H04L 5/0053 |
| 2020/0295907 A1* | 9/2020 | Li | H04L 5/0092 |
| 2020/0295913 A1 | 9/2020 | Takeda et al. | |
| 2020/0296658 A1* | 9/2020 | Li | H04W 48/08 |
| 2020/0314869 A1* | 10/2020 | Xu | H04W 72/1289 |
| 2020/0351851 A1* | 11/2020 | Aiba | H04W 72/044 |
| 2021/0068147 A1 | 3/2021 | Sato et al. | |
| 2021/0092008 A1 | 3/2021 | Yi et al. | |
| 2021/0126763 A1* | 4/2021 | Zhou | H04W 74/0841 |
| 2021/0167930 A1* | 6/2021 | Jeon | H04L 27/2607 |
| 2021/0176757 A1* | 6/2021 | Hwang | H04W 72/042 |
| 2021/0194654 A1 | 6/2021 | Zhang et al. | |
| 2021/0212025 A1 | 7/2021 | Selvanesan et al. | |

FOREIGN PATENT DOCUMENTS

| | | |
|---|---|---|
| CN | 106455081 A | 2/2017 |
| WO | 2017093791 A1 | 6/2017 |

OTHER PUBLICATIONS

Huawei et al: "Bandwidth part activation and adaptation", 3GPP Draft: R1-1717905; 3rd Generation Partnership Project (3GPP), Mobile Competence Centre : 650, Route Des Lucioles: F-06921 Sophia-Antipolis Cedex: France vol. RAN WG1, No. Prague, Czech Republic; Oct. 9, 2017-Oct. 13, 2017 Oct. 2, 2017 (Oct. 2, 2017), XP051352314, Retrieved from the Internet: URL: http://www.3gpp.org/ftp/tsg_ran/WG1 RL1/TSGR1 90b/Docs/ [retrieved on Oct. 2, 2017].

Samsung: "Wider Bandwidth Operations"; 3GPP Draft: R1-1710761 NR Wider Bandwidth Operations. 3rd Generation Partnership Project (3GPP), Mobile Competence Centre: 650, Route Des Lucioles; F-06921 Sophia-Antipolis Cedex: France vol. RAN WG1, No. Qingdao, P.R. China; Jun. 27, 2017-Jun. 30, 2017, Jun. 26, 2017 (Jun. 26, 2017), XP051299966, Retrieved from the Internet: JRL: http://www.3gpp.org/ftp/Meetings_3GPPSYNC/RAN1/Docs/ [retrieved Jun. 26, 2017].

Supplementary European Search Report in the European application No. 18905197.2, dated Nov. 27, 2020.

Written Opinion of the International Search Authority in the international application No. PCT/CN2018/075838, dated Oct. 25, 2018.

3GPP. "Bandwidth Part Configuration and Frequency Resource Allocation" 3GPP TSG RAN WGI NR Ad-Hoc #2 R1-1710164. Qingdao, P.R. China June 27-30, 2017 Jun. 30, 2017 (Jun. 30, 2017) entire document.

3GPP. "Overall Impact in RAN2 for BWP" 3GPP TSG RAN WG2 Meeting #99 bis R2-1710592, Prague, Czech Republic, Oct. 9-13, 2017, Oct. 13, 2017 (Oct. 13, 2017), entire document.

International Search Report in the international application No. PCT/CN2018/075838, dated Oct. 25, 2018.

International Search Report in the international application No. PCT/CN2018/075854, dated Nov. 1, 2018.

Written Opinion of the International Search Authority in the international application No. PCT/CN2018/075854, dated Nov. 1, 2018.

Supplementary European Search Report in the European application No. 18904590.9, dated Dec. 2, 2020.

Huawei et al:"Remaining issues on bandwidth part", 3GPP Draft; R1-1717077, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017, Oct. 8, 2017(Oct. 8, 2017), XP051340268.

ZTE:"Resource allocation for wideband operation", 3GPP Draft; R1-1710126, 3rd Generation Partnership Project (3GPP), Mobile Competence Centre; 650, Route Des Lucioles: F-06921 Sophia-Antipolis Cedex; France, vol. RAN WG1, No. Prague, Qingdao, P. R. China; Jun. 27, 2017-Jun. 30, 2017 Jun. 26, 2017 (Jun. 26, 2017), XP051299350.

MediaTek Inc.,"Remaining Details on Bandwidth Part Operation in NR", 3GPP TSG RAN WG1 Meeting 90bis, R1-1718327, Oct. 9-13, 2017.

Non-Final Office Action of the U.S. Appl. No. 16/988,020, dated Aug. 19, 2022.

* cited by examiner

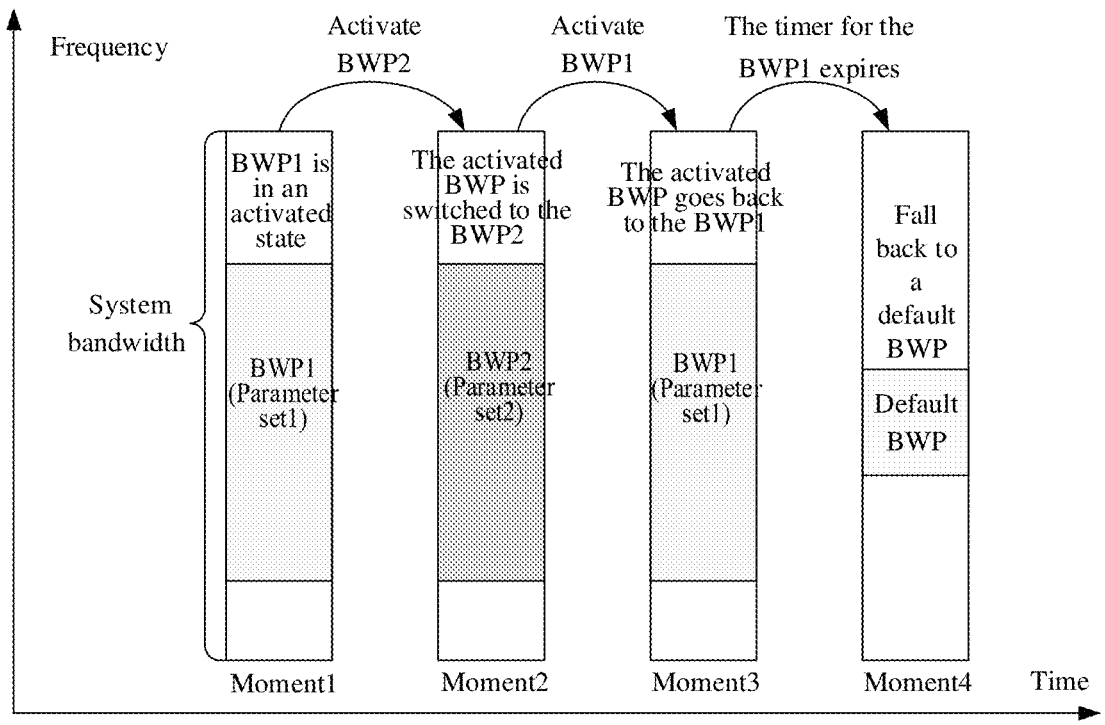

FIG. 1

| A terminal receives first control information sent by a network device, a BWP currently activated by the terminal being a first BWP, the first control information comprising first indication information, the first indication information indicating that the BWP to be activated is a second BWP | 201 |

| The terminal determines whether both of the first BWP and the second BWP can be activated at the same time, and if so, the terminal activates the second BWP while keeping the first BWP to be in an activated state | 202 |

FIG. 2

| A network device sends first control information to a terminal, a BWP presently activated by the terminal being a first BWP, the first control information including first indication information, and the first indication information being used to indicate that a BWP to-be-activated is a second BWP, so that when determining that the first BWP and the second BWP are able to be activated simultaneously, the terminal keeps the first BWP to be continuously in an activated state during activating the second BWP | 301 |

FIG. 3

RESOURCE CONFIGURATION METHOD AND DEVICE, AND COMPUTER STORAGE MEDIUM

CROSS-REFERENCE TO RELATED APPLICATION

This is a continuation application of International Patent Application No. PCT/CN2018/075838, filed on Feb. 8, 2018, the contents of which are hereby incorporated by reference in its entirety.

BACKGROUND

In a Long Term Evolution (LTE) system, a frequency domain resource of a terminal is allocated in a whole system bandwidth. As the system bandwidth is greatly improved in a $5^{th}$ Generation (5G) New Radio (NR) system, it is possible that a transmission bandwidth of the terminal occupies only a part of the system bandwidth.

In current research of 5G NR, it has been decided to introduce a concept of a Band Width Part (BWP) to implement the allocation of the frequency domain resource within a range smaller than the system bandwidth. A base station may configure multiple BWPs via Radio Resource Control (RRC) signaling, and then dynamically activate some BWP in Downlink Control Information (DCI). Each BWP is based on a parameter set, and the parameter set includes a sub-carrier spacing and a Cyclic Prefix (CP). According to current solutions, only one BWP are able to be activated for one terminal; and when a new BWP is activated, the previous BWP is deactivated.

As shown in FIG. 1, when the BWP1 is in an activated state, if the BWP2 is activated, the BWP1 is deactivated; and if the BWP1 is deactivated, it falls back to a default BWP.

According to the existing technical solutions, multiple BWPs are disable to be activated simultaneously, that is, multiple parameter sets cannot be used simultaneously, and when multiple types of services are transmitted concurrently, parameters sets of different services cannot be optimized respectively. Moreover, the switchover between two parameter sets also lead to the switchover between two BWPs, and the conversion of a Radio Frequency (RF) bandwidth of the terminal; and due to the conversion of the RF bandwidth, the terminal cannot receive or send data within a period of time to cause a waste of a spectrum resource.

SUMMARY

The disclosure relates to the technical field of wireless communications.

In order to solve the above-mentioned technical problem, the embodiments of the disclosure provide a method and device for resource configuration, and a computer storage medium.

The implementation of the disclosure provides a method for resource configuration, which includes the following operations.

A terminal receives first control information sent by a network device, a BWP currently activated by the terminal being a first BWP, the first control information including first indication information, and the first indication information being used to indicate that a BWP to-be-activated is a second BWP.

The terminal determines whether the first BWP and the second BWP are able to be activated simultaneously, and if the first BWP and the second BWP are able to be activated simultaneously, the terminal keeps the first BWP to be continuously in an activated state during activating the second BWP.

In an implementation of the disclosure, the method further includes the following operation.

If the first BWP and the second BWP are disable to be activated simultaneously, the terminal deactivates the first BWP during activating the second BWP.

In an implementation of the disclosure, the operation that the terminal determines whether the first BWP and the second BWP are able to be activated simultaneously includes the following operations.

If the first BWP and the second BWP satisfy a predetermined rule, the terminal determines that the first BWP and the second BWP are able to be activated simultaneously.

If the first BWP and the second BWP do not satisfy the predetermined rule, the terminal determines that the first BWP and the second BWP are disable to be activated simultaneously.

In an implementation of the disclosure, the first BWP and the second BWP satisfy the predetermined rule, which includes the followings:

a central frequency point and a bandwidth size of the first BWP is consistent with a central frequency point and a bandwidth size of the second BWP, respectively; or a frequency domain range of the second BWP is within a frequency domain range of the first BWP; or an RF bandwidth capacity of the terminal is able to simultaneously cover a frequency domain range of the first BWP and a frequency domain range of the second BWP.

In an implementation of the disclosure, the operation that the terminal determines whether the first BWP and the second BWP are able to be activated simultaneously includes the following operation.

The terminal receives second control information sent by the network device, the second control information including second indication information, and the second indication information indicating whether the first BWP and the second BWP are able to be activated simultaneously.

In an implementation of the disclosure, the second control information is one of DCI, Radio Resource Control (RRC) signaling, or System Information (SI).

In an implementation of the disclosure, the method further includes the following operations.

The terminal receives first configuration information sent by the network device, the first configuration information including first duration information corresponding to the first BWP and/or second duration information corresponding to the second BWP, the first duration information being used to enable, when an activated duration of the first BWP reaches a first duration, the terminal to deactivate the first BWP, and the second duration information being used to enable, when an activated duration of the second BWP reaches a second duration, the terminal to deactivate the second BWP.

The terminal deactivates the first BWP and/or the second BWP based on the first configuration information.

In an implementation of the disclosure, the method further includes the following operations.

The terminal receives third control information sent by the network device, the third control information including third indication information, and the third indication information being used to indicate that a BWP to-be-deactivated is the first BWP and/or the second BWP.

The terminal deactivates the first BWP and/or the second BWP based on the third control information.

In an implementation of the disclosure, the method further includes the following operation.

A default BWP is activated when both the first BWP and the second BWP are deactivated.

The implementation of the disclosure provides a method for resource configuration, which includes the following operation.

A network device sends first control information to a terminal, a BWP currently activated by the terminal being a first BWP, the first control information including first indication information, and the first indication information being used to indicate that a BWP to-be-activated is a second BWP, so that when determining that the first BWP and the second BWP are able to be activated simultaneously, the terminal keeps the first BWP to be continuously in an activated state during activating the second BWP.

In an implementation of the disclosure, if the first BWP and the second BWP are disable to be activated simultaneously, the first indication information is used to enable the terminal to deactivate the first BWP during activating the second BWP.

In an implementation of the disclosure, whether the first BWP and the second BWP are able to be activated simultaneously includes the followings.

If the first BWP and the second BWP satisfy a predetermined rule, the first BWP and the second BWP are able to be activated simultaneously.

If the first BWP and the second BWP do not satisfy the predetermined rule, the first BWP and the second BWP are disable to be activated simultaneously.

In an implementation of the disclosure, the first BWP and the second BWP satisfy a predetermined rule, which includes the followings:

a central frequency point and a bandwidth size of the first BWP is consistent with a central frequency point and a bandwidth size of the second BWP, respectively; or a frequency domain range of the second BWP is within a frequency domain range of the first BWP; or an RF bandwidth capacity of the terminal is able to simultaneously cover the frequency domain range of the first BWP and the frequency domain range of the second BWP.

In an implementation of the disclosure, the method further includes the following operation.

The network device sends second control information to the terminal, the second control information including second indication information, and the second indication information indicating whether the first BWP and the second BWP are able to be activated simultaneously.

In an implementation of the disclosure, the second control information is one of DCI, RRC signaling, or SI.

In an implementation of the disclosure, the method further includes the following operation.

The network device sends first configuration information to the terminal device, the first configuration information including first duration information corresponding to the first BWP and/or second duration information corresponding to the second BWP, the first duration information being used to enable, when an activated duration of the first BWP reaches a first duration, the terminal to deactivate the first BWP, and the second duration information being used to enable, when an activated duration of the second BWP reaches a second duration, the terminal to deactivate the second BWP.

In an implementation of the disclosure, the method further includes the following operation.

The network device sends third control information to the terminal device, the third control information including third indication information, and the third indication information being used to indicate that a BWP to-be-deactivated is the first BWP and/or the second BWP.

The implementation of the disclosure provides a device for resource configuration, which includes: a first receiving unit, a determination unit, and an activation and deactivation unit.

The first receiving unit is configured to receive first control information sent by a network device, a present activated BWP of a terminal being a first BWP, the first control information including first indication information, and the first indication information being used to indicate that a BWP to-be-activated is a second BWP.

The determination unit is configured to determine whether the first BWP and the second BWP are able to be activated simultaneously.

The activation and deactivation unit is configured to keep, if the first BWP and the second BWP are able to be activated simultaneously, the first BWP to be continuously in an activated state during activating the second BWP.

In an implementation of the disclosure, the activation and deactivation unit is further configured to deactivate, if the first BWP and the second BWP are disable to be activated simultaneously, the first BWP during activating the second BWP.

In an implementation of the disclosure, the determination unit is configured to determine, if the first BWP and the second BWP satisfy a predetermined rule, that the first BWP and the second BWP are able to be activated simultaneously; and determine, if the first BWP and the second BWP do not satisfy the predetermined rule, that the first BWP and the second BWP are disable to be activated simultaneously.

In an implementation of the disclosure, the first BWP and the second BWP satisfy a predetermined rule, which includes the followings:

a central frequency point and a bandwidth size of the first BWP is consistent with a central frequency point and a bandwidth size of the second BWP, respectively; or a frequency domain range of the second BWP is within a frequency domain range of the first BWP; or an RF bandwidth capacity of the terminal is able to simultaneously cover the frequency domain range of the first BWP and the frequency domain range of the second BWP.

In an implementation of the disclosure, the device further includes: a second receiving unit.

The second receiving unit is configured to receive second control information sent by the network device, the second control information including second indication information, and the second indication information indicating whether the first BWP and the second BWP are able to be activated simultaneously.

The determination unit is configured to determine, based on the second control information, whether the first BWP and the second BWP are able to be activated simultaneously.

In an implementation of the disclosure, the second control information is one of DCI, signaling, or SI.

In an implementation of the disclosure, the device further includes: a third receiving unit.

The third receiving unit is configured to receive first configuration information sent by the network device, the first configuration information including first duration information corresponding to the first BWP and/or second duration information corresponding to the second BWP, the first duration information being used to enable, when an activated duration of the first BWP reaches a first duration, the terminal to deactivate the first BWP, and the second duration information being used to enable, when an activated duration of the second BWP reaches a second duration, the terminal to deactivate the second BWP.

The activation and deactivation unit is further configured to deactivate the first BWP and/or the second BWP based on the first configuration information.

In an implementation of the disclosure, the device further includes: a fourth receiving unit.

The fourth receiving unit is configured to receive third control information sent by the network device, the third control information including third indication information, and the third indication information being used to indicate that a BWP to-be-deactivated is the first BWP and/or the second BWP.

The activation and deactivation unit is further configured to deactivate the first BWP and/or the second BWP based on the third control information.

In an implementation of the disclosure, the activation and deactivation unit is further configured to activate a default BWP when both the first BWP and the second BWP are deactivated.

The implementation of the disclosure provides a device for resource configuration, which includes: a first sending unit.

The first sending unit is configured to send first control information to a terminal, a BWP currently activated by the terminal being a first BWP, the first control information including first indication information, and the first indication information being used to indicate that a BWP to-be-activated is a second BWP, so that when determining that the first BWP and the second BWP are able to be activated simultaneously, the terminal keeps the first BWP to be continuously in an activated state during activating the second BWP.

In an implementation of the disclosure, if the first BWP and the second BWP are disable to be activated simultaneously, the first indication information is used to enable the terminal to deactivate the first BWP during activating the second BWP.

In an implementation of the disclosure, whether the first BWP and the second BWP are able to be activated simultaneously includes the followings.

If the first BWP and the second BWP satisfy a predetermined rule, the first BWP and the second BWP are able to be activated simultaneously.

If the first BWP and the second BWP do not satisfy the predetermined rule, the first BWP and the second BWP are disable to be activated simultaneously.

In an implementation of the disclosure, the first BWP and the second BWP satisfy a predetermined rule, which includes the followings:

a central frequency point and a bandwidth size of the first BWP is consistent with a central frequency point and a bandwidth size of the second BWP, respectively; or a frequency domain range of the second BWP is within a frequency domain range of the first BWP; or an RF bandwidth capacity of the terminal is able to simultaneously cover the frequency domain range of the first BWP and the frequency domain range of the second BWP.

In an implementation of the disclosure, the device further includes: a second sending unit.

The second sending unit is configured to send second control information to the terminal, the second control information including second indication information, and the second indication information indicating whether the first BWP and the second BWP are able to be activated simultaneously.

In an implementation of the disclosure, the second control information is one of DCI, RRC signaling, or SI.

In an implementation of the disclosure, the device further includes: a third sending unit.

The third sending unit is configured to send first configuration information to the terminal device, the first configuration information including first duration information corresponding to the first BWP and/or second duration information corresponding to the second BWP, the first duration information being used to enable, when an activated duration of the first BWP reaches a first duration, the terminal to deactivate the first BWP, and the second duration information being used to enable, when an activated duration of the second BWP reaches a second duration, the terminal to deactivate the second BWP.

In an implementation of the disclosure, the device further includes: a fourth sending unit.

The fourth sending unit is configured to send third control information to the terminal device, the third control information including third indication information, and the third indication information being used to indicate that a BWP to-be-deactivated is the first BWP and/or the second BWP.

The implementation of the disclosure provides a computer storage medium having stored therein computer executable instructions that when being executed by a processor, implement the above-mentioned resource configuration method.

BRIEF DESCRIPTION OF THE DRAWINGS

The accompanying drawings are described here to provide a further understanding of the disclosure, and form a part of the disclosure. The schematic embodiments and description of the disclosure are adopted to explain the disclosure, and do not form improper limits to the disclosure. In the drawings:

FIG. 1 is a schematic diagram showing that only one BWP is able to be in an activated state.

FIG. 2 is a first flowchart schematic diagram of a method for resource configuration according to an implementation of the disclosure.

FIG. 3 is a second flowchart schematic diagram of a method for resource configuration according to an implementation of the disclosure.

DETAILED DESCRIPTION

Figure 4:
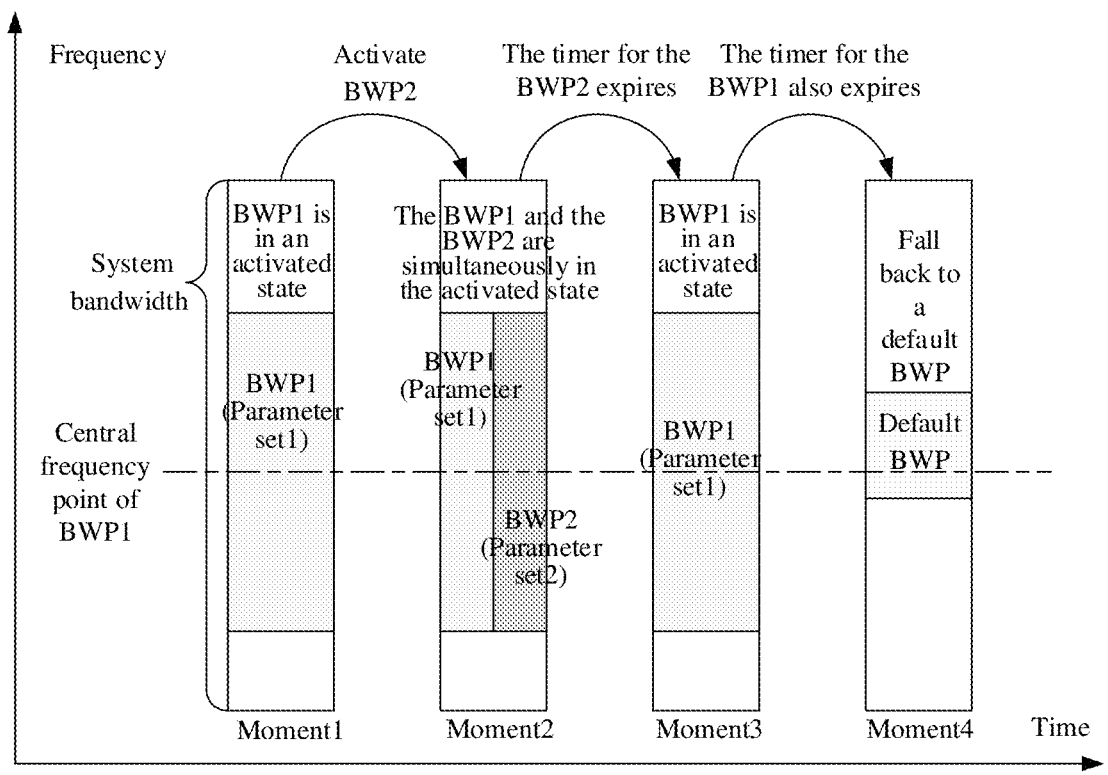
FIG. 4 is a schematic diagram showing that a central frequency point and a bandwidth size of a BWP1 are consistent with that of a BWP2, respectively, and the BWP2 is deactivated earlier than the BWP1.

For making the characteristics and technical contents of the embodiments of the disclosure understood in more detail, implementation of the embodiments of the disclosure will be described below in combination with the drawings in detail. The drawings are only adopted for description as references and not intended to limit the embodiments of the disclosure.

FIG. 2 is a first flowchart schematic diagram of a method for resource configuration according to an implementation of the disclosure. As shown in FIG. 2, the method for resource configuration includes the following steps.

At 201: a terminal receives first control information sent by a network device, a BWP currently activated by the terminal being a first BWP, the first control information including first indication information, and the first indication information being used to indicate that a BWP to-be-activated is a second BWP.

In the implementation of the disclosure, the terminal may be any device capable of communicating with a network such as a mobile phone, a tablet computer, a notebook and a desktop computer.

In the implementation of the disclosure, the network device may be a base station, such as a gNB in a 5G system.

In the implementation of the disclosure, the first control information is DCI or a Media Access Control Control Element (MAC CE).

At 202: the terminal determines whether both of the first BWP and the second BWP can be activated at the same time, and if so, the terminal activates the second BWP while keeping the first BWP to be in an activated state.

For example, the BWP currently activated by the terminal is the BWP1, the terminal receives the first control information from the network device, and the first control information includes indication information for activating the BWP2; and if the BWP1 and the BWP2 are able to be simultaneously activated, the terminal keeps the BWP1 to be continuously in an activated state during activating the BWP2.

In the implementation of the disclosure, if the first BWP and the second BWP are disable to be activated simultaneously, the terminal deactivates the first BWP during activating the second BWP.

In the implementation of the disclosure, the operation that the terminal determines whether the first BWP and the second BWP are able to be activated simultaneously may be implemented via the following manners.

Manner 1: if the first BWP and the second BWP satisfy a predetermined rule, the terminal determines that the first BWP and the second BWP are able to be activated simultaneously; and if the first BWP and the second BWP do not satisfy the predetermined rule, the terminal determines that the first BWP and the second BWP are disable to be activated simultaneously.

In the implementation of the disclosure, the first BWP and the second BWP satisfy a predetermined rule, which includes at least one of the followings.

1) A central frequency point and a bandwidth size of the first BWP is consistent with a central frequency point and a bandwidth size of the second BWP, respectively.

2) A frequency domain range of the second BWP is within a frequency domain range of the first BWP.

3) An RF bandwidth capacity of the terminal is able to simultaneously cover the frequency domain range of the first BWP and the frequency domain range of the second BWP.

Manner 2: the terminal receives second control information sent by the network device, the second control information including second indication information, and the second indication information indicating whether the first BWP and the second BWP are able to be activated simultaneously.

In an implementation, the second control information is one of DCI, RRC signaling, or SI.

In the implementation of the disclosure, the terminal may deactivate, via the following manners, a BWP that has already been in the activated state.

Manner 1: the terminal receives first configuration information sent by the network device, the first configuration information including first duration information corresponding to the first BWP and/or second duration information corresponding to the second BWP, the first duration information being used to enable, when an activated duration of the first BWP reaches a first duration, the terminal to deactivate the first BWP, and the second duration information being used to enable, when an activated duration of the second BWP reaches a second duration, the terminal to deactivate the second BWP; and the terminal deactivates the first BWP and/or the second BWP based on the first configuration information.

For example, when either of timer1 for the BWP1 and timer2 for the BWP2 expires, a corresponding BWP is deactivated.

Manner 2: the terminal receives third control information sent by the network device, the third control information including third indication information, and the third indication information being used to indicate that a BWP to-be-deactivated is the first BWP and/or the second BWP; and the terminal deactivates the first BWP and/or the second BWP based on the third control information.

For example, when the terminal receives the third control information, the third control information including indication information for deactivating the BWP1/or the BWP2, the corresponding BWP is deactivated.

In an implementation, a default BWP is activated when both the first BWP and the second BWP are deactivated.

For example, when both the BWP1 and the BWP2 are deactivated, the activated BWP is changed into the default BWP.

In the technical solutions provided by the implementations of the disclosure, a terminal receives first control information sent by a network device, a BWP currently activated by the terminal being a first BWP, the first control information including first indication information, and the first indication information being used to indicate that a BWP to-be-activated is a second BWP; and the terminal determines whether the first BWP and the second BWP are able to be activated simultaneously, and if the first BWP and the second BWP are able to be activated simultaneously, the terminal keeps the first BWP to be continuously in an activated state during activating the second BWP. By adopting the technical solutions of the implementations of the disclosure, a manner capable of simultaneously activating multiple BWPs is introduced, that is, in a certain condition, while a BWP is not deactivated, another BWP is used to transmit a signal; and therefore, the simultaneous transmission for multiple types of services is supported flexibly, and the scheduling flexibility of a system and the utilization rate of a spectrum are improved.

FIG. 3 is a second flowchart schematic diagram of a method for resource configuration according to an implementation of the disclosure. As shown in FIG. 3, the method for resource configuration includes the following step.

At 301: a network device sends first control information to a terminal, a BWP currently activated by the terminal being a first BWP, the first control information including first indication information, and the first indication information being used to indicate that a BWP to-be-activated is a second BWP, so that when determining that the first BWP and the second BWP are able to be activated simultaneously, the terminal keeps the first BWP to be continuously in an activated state during activating the second BWP.

In the implementation of the disclosure, if the first BWP and the second BWP are disable to be activated simultaneously, the first indication information is used to enable the terminal to deactivate the first BWP during activating the second BWP.

In the implementation of the disclosure, whether the first BWP and the second BWP are able to be activated simultaneously may be determined via the following manners.

Manner 1: if the first BWP and the second BWP satisfy a predetermined rule, the terminal determines that the first BWP and the second BWP are able to be activated simultaneously; and if the first BWP and the second BWP do not satisfy the predetermined rule, the first BWP and the second BWP are disable to be activated simultaneously.

In an implementation, the first BWP and the second BWP satisfy a predetermined rule, which includes the followings.

A central frequency point and a bandwidth size of the first BWP is consistent with a central frequency point and a bandwidth size of the second BWP, respectively.

Or, a frequency domain range of the second BWP is within a frequency domain range of the first BWP.

Or, an RF bandwidth capacity of the terminal is able to simultaneously cover the frequency domain range of the first BWP and the frequency domain range of the second BWP.

Manner 2: the network device sends second control information to the terminal, the second control information including second indication information, and the second indication information indicating whether the first BWP and the second BWP are able to be activated simultaneously.

In an implementation, the second control information is one of DCI, RRC signaling, or SI.

In an implementation, the method further includes: the network device sends first configuration information to the terminal device, the first configuration information including first duration information corresponding to the first BWP and/or second duration information corresponding to the second BWP, the first duration information being used to enable, when an activated duration of the first BWP reaches a first duration, the terminal to deactivate the first BWP, and the second duration information being used to enable, when an activated duration of the second BWP reaches a second duration, the terminal to deactivate the second BWP.

In an implementation, the method further includes: the network device sends third control information to the terminal device, the third control information including third indication information, and the third indication information being used to indicate that a BWP to-be-deactivated is the first BWP and/or the second BWP.

The technical solutions of the disclosure are further described below in combination with specific application examples.

Example 1: a central frequency point and a bandwidth size of a BWP1 is consistent with a central frequency point and a bandwidth size of a BWP2, respectively, and the BWP2 is deactivated earlier than the BWP1.

As shown in FIG. 4, unlike the existing technical solutions, when the BWP1 is in an activated state, if the BWP2 is activated, as a central frequency point and a bandwidth size of the BWP2 is consistent with that of the BWP1 and an RF bandwidth and a central frequency point of a terminal may not be adjusted, the BWP1 is not deactivated, and the BWP1 and the BWP2 are simultaneously in the activated state. When the BWP2 is deactivated (for example, a timer for the BWP2 expires), it goes back to a status in which only the BWP1 is activated. When the BWP1 is also deactivated (for example, a timer for the BWP1 expires), it falls back to a default BWP.

By adopting the new technical solutions, two parameter sets may be supported in a condition that the RF bandwidth and the central frequency point of the terminal are not adjusted; and therefore, the simultaneous transmission for multiple types of services is supported flexibly, and the scheduling flexibility of a system and the utilization rate of a spectrum are improved.

Example 2: a central frequency point and a bandwidth size of a BWP1 is consistent with a central frequency point and a bandwidth size of a BWP2, and the BWP1 is deactivated earlier than the BWP2.

Figure 5:
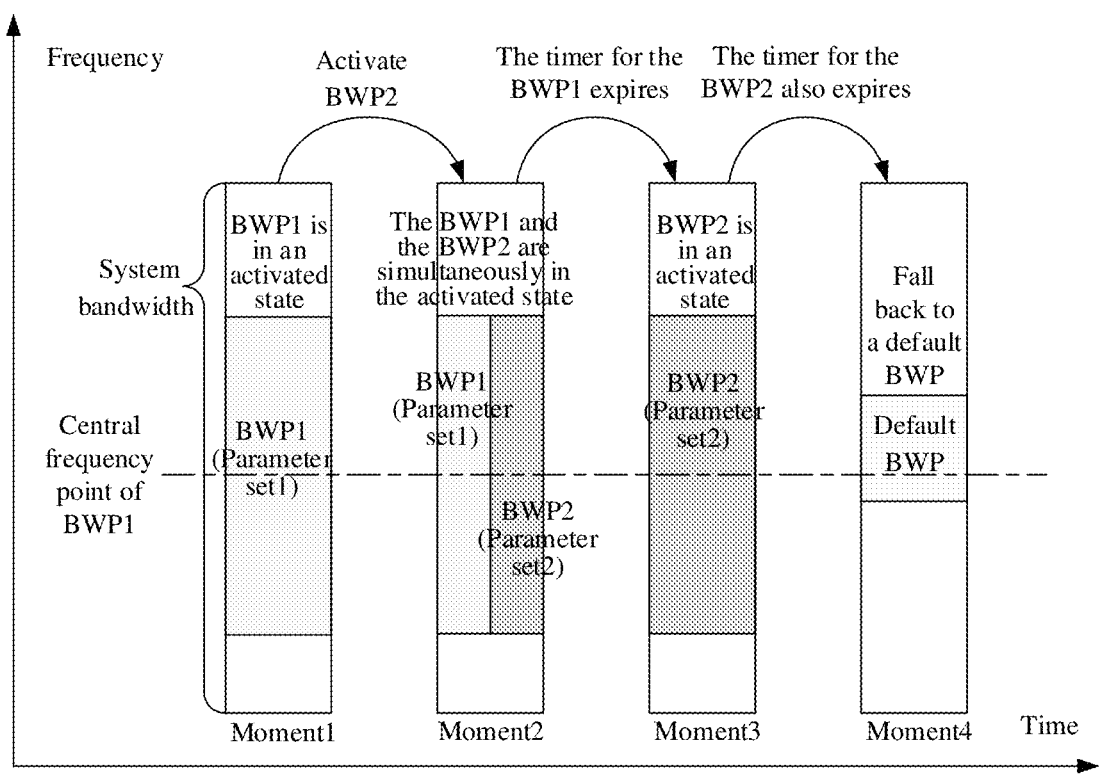
FIG. 5 is a schematic diagram showing that a central frequency point and a bandwidth size of a BWP1 are consistent with that of a BWP2, respectively, and the BWP1 is deactivated earlier than the BWP2.

As shown in FIG. 5, unlike the existing technical solutions, when the BWP1 is in an activated state, if the BWP2 is activated, as a central frequency point and bandwidth size of the BWP2 is consistent with that of the BWP1, and an RF bandwidth and a central frequency point of a terminal may not be adjusted, the BWP1 is not deactivated, and the BWP1 and the BWP2 are simultaneously in the activated state. Different from example 1, in this example, the BWP1 is deactivated earlier than the BWP2 (for example, a timer for the BWP1 expires); and at this time, it enters a status in which only the BWP2 is activated. When the BWP2 is also deactivated (for example, a timer for the BWP2 expires), it falls back to a default BWP.

By adopting the new technical solutions, two parameter sets may be supported in a condition that the RF bandwidth and the central frequency point of the terminal are not adjusted; and therefore, the simultaneous transmission for multiple types of services is supported flexibly, and the scheduling flexibility of a system and the utilization rate of a spectrum are improved.

Example 3: a central frequency point of a BWP1 is consistent with that of a BWP2 and a bandwidth of the BWP2 is smaller than that of the BWP1, and the BWP2 is deactivated earlier than the BWP1.

Figure 6:
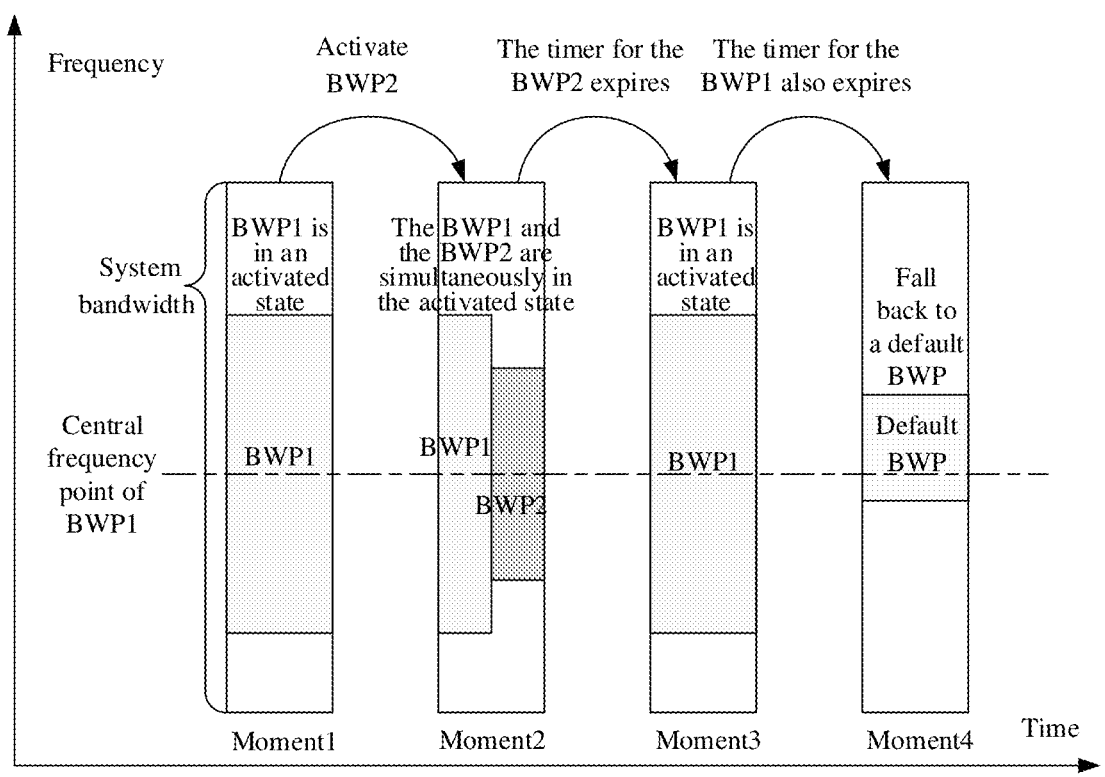
FIG. 6 is a schematic diagram showing that a central frequency point of a BWP1 is consistent with that of a BWP2 and a bandwidth of the BWP2 is smaller than that of the BWP1, and the BWP2 is deactivated earlier than the BWP1.

As shown in FIG. 6, unlike the existing technical solutions, when the BWP1 is in an activated state, if the BWP2 is activated, as a central frequency point of the BWP2 is consistent with that of the BWP1 and the bandwidth size of the BWP2 is smaller than that of the BWP1, and an RF bandwidth and a central frequency point of a terminal may not be adjusted, the BWP1 is not deactivated, and the BWP1 and the BWP2 are simultaneously in the activated state. When the BWP2 is deactivated (for example, a timer for the BWP2 expires), it goes back to a status in which only the BWP1 is activated. When the BWP1 is also deactivated (for example, a timer for the BWP1 expires), it falls back to a default BWP.

By adopting the new technical solutions, two parameter sets and/or two bandwidths may be supported in a condition that the RF bandwidth and the central frequency point of the terminal are not adjusted; and therefore, the simultaneous transmission for multiple types of services is supported flexibly, and the scheduling flexibility of a system and the utilization rate of a spectrum are improved.

Example 4: a central frequency point of a BWP1 is consistent with that of a BWP2 and a bandwidth of the BWP2 is smaller than that of the BWP1, and the BWP1 is deactivated earlier than the BWP2.

Figure 7:
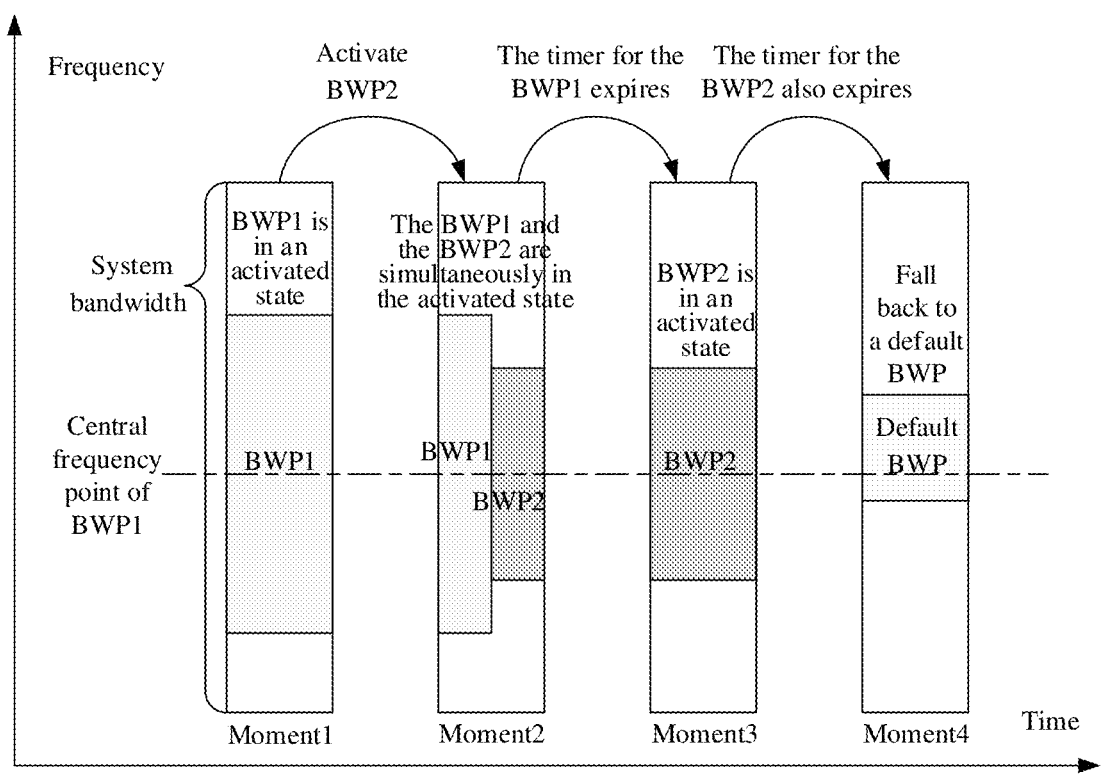
FIG. 7 is a schematic diagram showing that in case that a central frequency point of a BWP1 is consistent with that of a BWP2 and a bandwidth of the BWP2 is smaller than that of the BWP1, the BWP1 is deactivated earlier than the BWP2.

As shown in FIG. 7, unlike the existing technical solutions, when the BWP1 is in an activated state, if the BWP2 is activated, as a central frequency point of the BWP2 is consistent with that the BWP1 and the bandwidth size of the BWP2 is smaller than that of the BWP1, and an RF bandwidth and a central frequency point of a terminal may still not be adjusted, the BWP1 is not deactivated, and the BWP1 and the BWP2 are simultaneously in the activated state. Different from example 3, in this example, the BWP1 is deactivated earlier than the BWP2 (for example, a timer for the BWP1 expires); and at the time, it enters a status in which only the BWP2 is activated. When the BWP2 is also deactivated (for example, a timer for the BWP2 expires), it falls back to a default BWP.

By adopting the new technical solutions, two parameter sets and/or two bandwidths may be supported in a condition that the RF bandwidth and the central frequency point of the terminal are not adjusted; and therefore, the simultaneous transmission for multiple types of services is supported flexibly, and the scheduling flexibility of a system and the utilization rate of a spectrum are improved.

Example 5: a central frequency point of a BWP1 is inconsistent with that of a BWP2 but a frequency domain range of the BWP2 is within a frequency domain range of the BWP1, and the BWP2 is deactivated earlier than the BWP1.

Figure 8:
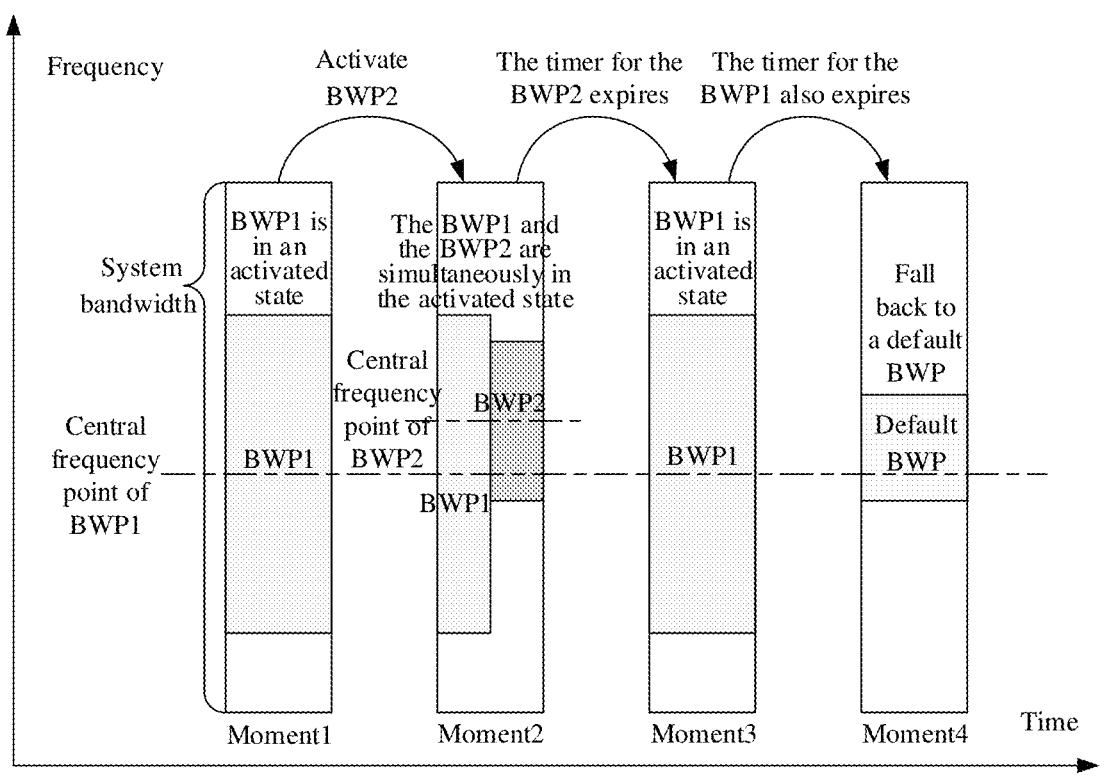
FIG. 8 is a schematic diagram showing that a central frequency point of a BWP1 is inconsistent with that of a BWP2 and a frequency domain range of the BWP2 is within a frequency domain range of the BWP1, and the BWP2 is deactivated earlier than the BWP1.

As shown in FIG. 8, unlike the existing technical solutions, when the BWP1 is in an activated state, if the BWP2 is activated, as a central frequency point of the BWP2 is inconsistent with that of the BWP1 but the frequency domain range of the BWP2 is within the frequency domain range of the BWP1, and an RF bandwidth and a central frequency point of a terminal may still not be adjusted, the BWP1 is not deactivated, and the BWP1 and the BWP2 are simultaneously in the activated state. When the BWP2 is deactivated (for example, a timer for the BWP2 expires), it goes back to a status in which only the BWP1 is activated. When the BWP1 is also deactivated (for example, a timer for the BWP1 expires), it falls back to a default BWP.

By adopting the new technical solutions, two parameter sets and/or two bandwidths may be supported in a condition that the RF bandwidth and the central frequency point of the terminal are not adjusted; and therefore, the simultaneous transmission for multiple types of services is supported flexibly, and the scheduling flexibility of a system and the utilization rate of a spectrum are improved.

Example 6: a central frequency point of a BWP1 is inconsistent with that of a BWP2 but a frequency domain range of the BWP2 is within a frequency domain range of the BWP1, and the BWP1 is deactivated earlier than the BWP2.

Figure 9:
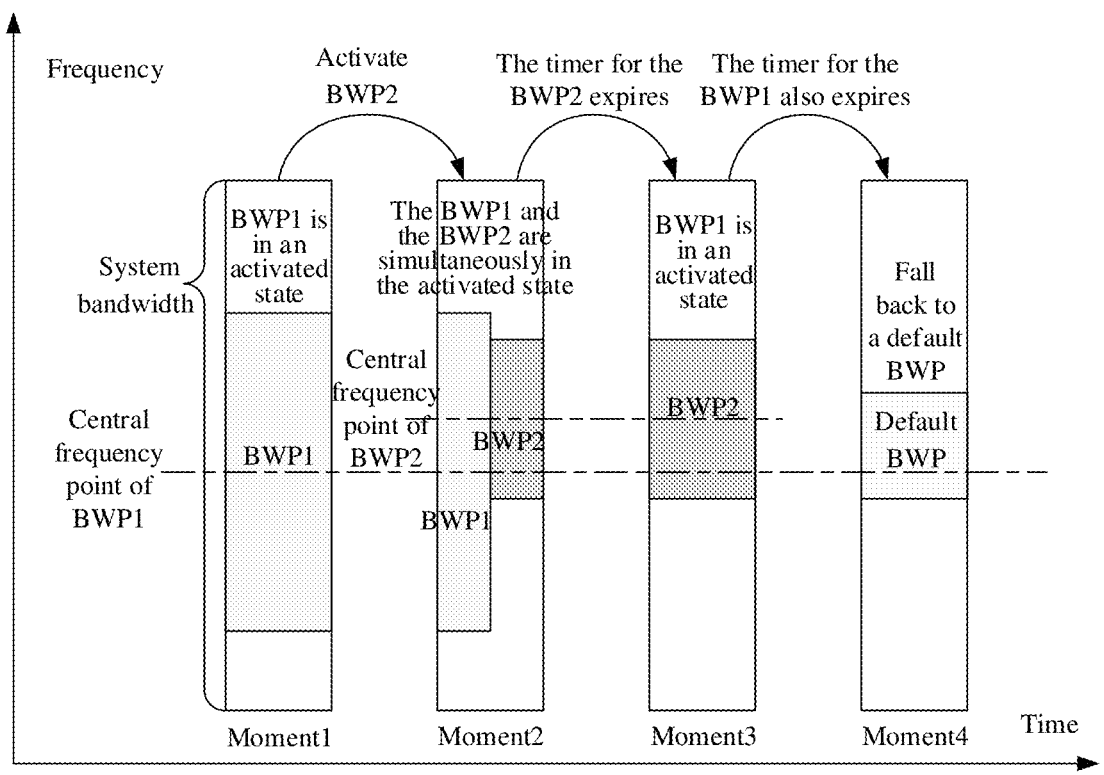
FIG. 9 is a schematic diagram showing that in case that a central frequency point of a BWP1 is inconsistent with that of a BWP2 and a frequency domain range of the BWP2 is within a frequency domain range of the BWP1, the BWP1 is deactivated earlier than the BWP2.

As shown in FIG. 9, unlike the existing technical solutions, when the BWP1 is in an activated state, if the BWP2 is activated, as a central frequency point of the BWP2 is inconsistent with that of the BWP1 but the frequency domain range of the BWP2 is within the frequency domain range of the BWP1, and an RF bandwidth and a central frequency point of a terminal may still not be adjusted, the BWP1 is not deactivated, and the BWP1 and the BWP2 are simultaneously in the activated state. Different from example 3, in this example, the BWP1 is deactivated earlier than the BWP2 (for example, a timer for the BWP1 expires); and at this time, it enters a status in which only the BWP2 is activated (for example, a timer for the BWP2 expires). When the BWP2 is also deactivated, it falls back to a default BWP.

By adopting the new technical solutions, two parameter sets and/or two bandwidths may be supported in a condition that the RF bandwidth and the central frequency point of the terminal are not adjusted; and therefore, the simultaneous transmission for multiple types of services is supported flexibly, and the scheduling flexibility of a system and the utilization rate of a spectrum are improved.

Figure 10:
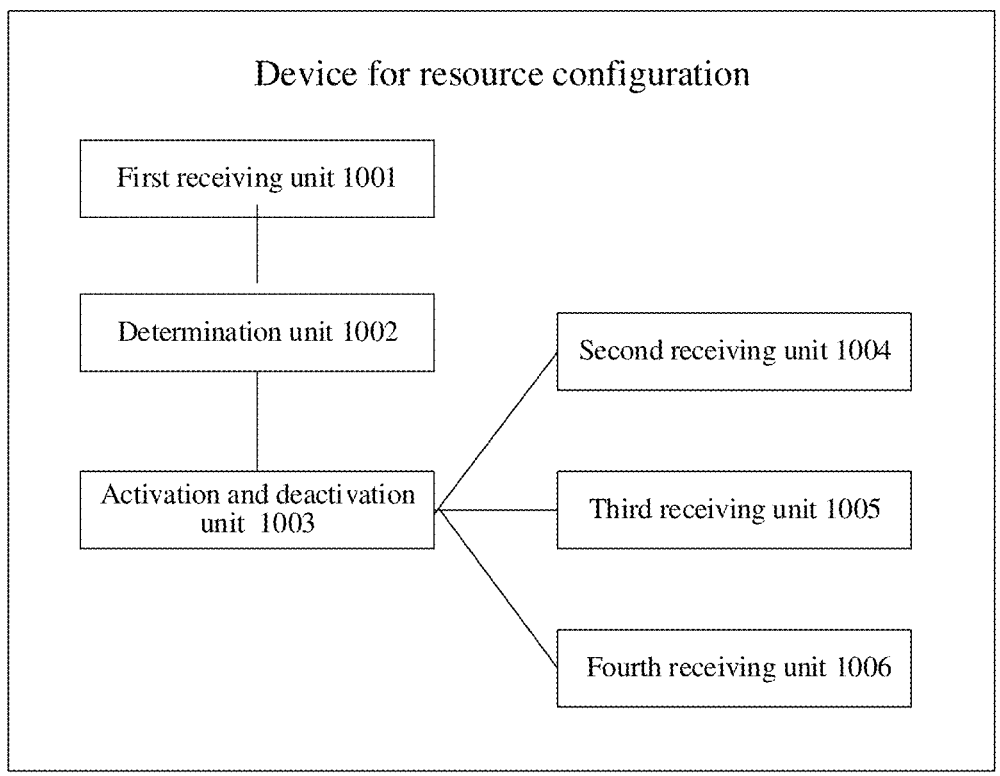
FIG. 10 is a first structural schematic diagram of a device for resource configuration according to an implementation of the disclosure.

FIG. 10 is a first structural schematic diagram of a device for resource configuration according to an implementation of the disclosure. As shown in FIG. 10, the device for resource configuration includes: a first receiving unit 1001, a determination unit 1002, and an activation and deactivation unit 1003.

The first receiving unit 1001 is configured to receive first control information sent by a network device, a BWP currently activated by a terminal being a first BWP, the first control information including first indication information, and the first indication information being used to indicate that a BWP to-be-activated is a second BWP.

The determination unit 1002 is configured to determine whether the first BWP and the second BWP are able to be activated simultaneously.

The activation and deactivation unit 1003 is configured to keep, if the first BWP and the second BWP are able to be activated simultaneously, the first BWP to be continuously in an activated state during activating the second BWP.

In an implementation, the activation and deactivation unit 1003 is further configured to deactivate, if the first BWP and the second BWP are disable to be activated simultaneously, the first BWP during activating the second BWP.

In an implementation, the determination unit 1002 is configured to determine, if the first BWP and the second BWP satisfy a predetermined rule, that the first BWP and the second BWP are able to be activated simultaneously; and determine, if the first BWP and the second BWP do not satisfy the predetermined rule, that the first BWP and the second BWP are disable to be activated simultaneously.

In an implementation, the first BWP and the second BWP satisfy a predetermined rule, which includes the followings.

A central frequency point and a bandwidth size of the first BWP is consistent with a central frequency point and a bandwidth size of the second BWP, respectively.

Or, a frequency domain range of the second BWP is within a frequency domain range of the first BWP.

Or, an RF bandwidth capacity of the terminal is able to simultaneously cover the frequency domain range of the first BWP and the frequency domain range of the second BWP.

In an implementation, the device further includes: a second receiving unit 1004.

The second receiving unit 1004 is configured to receive second control information sent by the network device, the second control information including second indication information, and the second indication information indicating whether the first BWP and the second BWP are able to be activated simultaneously.

The determination unit 1002 is configured to determine, based on the second control information, whether the first BWP and the second BWP are able to be activated simultaneously.

In an implementation, the second control information is one of DCI, signaling, or SI.

In an implementation, the device further includes: a third receiving unit 1005.

The third receiving unit 1005 is configured to receive first configuration information sent by the network device, the first configuration information including first duration information corresponding to the first BWP and/or second duration information corresponding to the second BWP, the first duration information being used to enable, when an activated duration of the first BWP reaches a first duration, the terminal to deactivate the first BWP, and the second duration information being used to enable, when an activated duration of the second BWP reaches a second duration, the terminal to deactivate the second BWP.

The activation and deactivation unit 1003 is further configured to deactivate the first BWP and/or the second BWP based on the first configuration information.

In an implementation, the device further includes: a fourth receiving unit 1006.

The fourth receiving unit 1006 is configured to receive third control information sent by the network device, the third control information including third indication information, and the third indication information being used to indicate that a BWP to-be-deactivated is the first BWP and/or the second BWP.

The activation and deactivation unit 1003 is further configured to deactivate the first BWP and/or the second BWP based on the third control information.

In an implementation, the activation and deactivation unit 1003 is further configured to activate a default BWP when both the first BWP and the second BWP are deactivated.

Those skilled in the art should know that functions realized by each unit in the device for resource configuration shown in FIG. 10 may be understood with reference to related descriptions about the method for resource configuration. The functions of each unit in the device for resource configuration shown in FIG. 10 may be realized through a program running in a processor, and may also be realized through a specific logical circuit.

Figure 11:
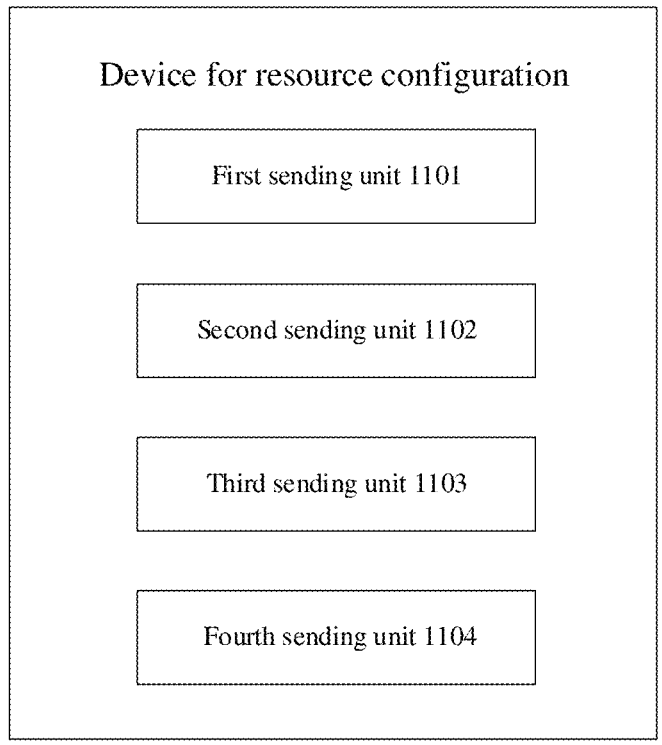
FIG. 11 is a second structural schematic diagram of a device for resource configuration according to an implementation of the disclosure.

FIG. 11 is a second structural schematic diagram of a device for resource configuration according to an implementation of the disclosure. As shown in FIG. 11, the device for resource configuration includes: a first sending unit 1101.

The first sending unit 1101 is configured to send first control information to a terminal, a BWP currently activated by the terminal being a first BWP, the first control information including first indication information, and the first indication information being used to indicate that a BWP to-be-activated is a second BWP, so that when determining that the first BWP and the second BWP are able to be activated simultaneously, the terminal keeps the first BWP to be continuously in an activated state during activating the second BWP.

In an implementation, if the first BWP and the second BWP are disable to be activated simultaneously, the first indication information is used to enable the terminal to deactivate the first BWP during activating the second BWP.

In an implementation, whether the first BWP and the second BWP are able to be activated simultaneously includes the followings.

If the first BWP and the second BWP satisfy a predetermined rule, the first BWP and the second BWP are able to be activated simultaneously.

If the first BWP and the second BWP do not satisfy the predetermined rule, the first BWP and the second BWP are disable to be activated simultaneously.

In an implementation, the first BWP and the second BWP satisfy a predetermined rule, which includes the followings.

A central frequency point and a bandwidth size of the first BWP is consistent with a central frequency point and a bandwidth size of the second BWP, respectively.

Or, a frequency domain range of the second BWP is within a frequency domain range of the first BWP.

Or, an RF bandwidth capacity of the terminal is able to simultaneously cover the frequency domain range of the first BWP and the frequency domain range of the second BWP.

In an implementation, the device further includes: a second sending unit 1102.

The second sending unit 1102 is configured to send second control information to the terminal, the second control information including second indication information, and the second indication information indicating whether the first BWP and the second BWP are able to be activated simultaneously.

In an implementation, the second control information is one of DCI, RRC signaling, or SI.

In an implementation, the device further includes: a third sending unit 1103.

The third sending unit 1103 is configured to send first configuration information to the terminal device, the first configuration information including first duration information corresponding to the first BWP and/or second duration information corresponding to the second BWP, the first duration information being used to enable, when an activated duration of the first BWP reaches a first duration, the terminal to deactivate the first BWP, and the second duration information being used to enable, when an activated duration of the second BWP reaches a second duration, the terminal to deactivate the second BWP.

In an implementation, the device further includes: a fourth sending unit 1104.

The fourth sending unit 1104 is configured to send third control information to the terminal device, the third control information including third indication information, and the third indication information being used to indicate that a BWP to-be-deactivated is the first BWP and/or the second BWP.

Those skilled in the art should know that functions realized by each unit in the device for resource configuration shown in FIG. 11 may be understood with reference to related descriptions about the method for resource configuration. The functions of each unit in the device for resource configuration shown in FIG. 11 may be realized through a program running in a processor, and may also be realized through a specific logical circuit.

When being implemented in form of software functional module and sold or used as an independent product, the device for resource configuration of the implementations of the disclosure may also be stored in a computer-readable storage medium. Based on such an understanding, the technical solutions of the implementations of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, the embodiments of the disclosure further provide a computer storage medium, which stores a computer executable instruction; and the computer executable instruction implements, when being executed by a processor, the above-mentioned resource configuration method.

Figure 12:
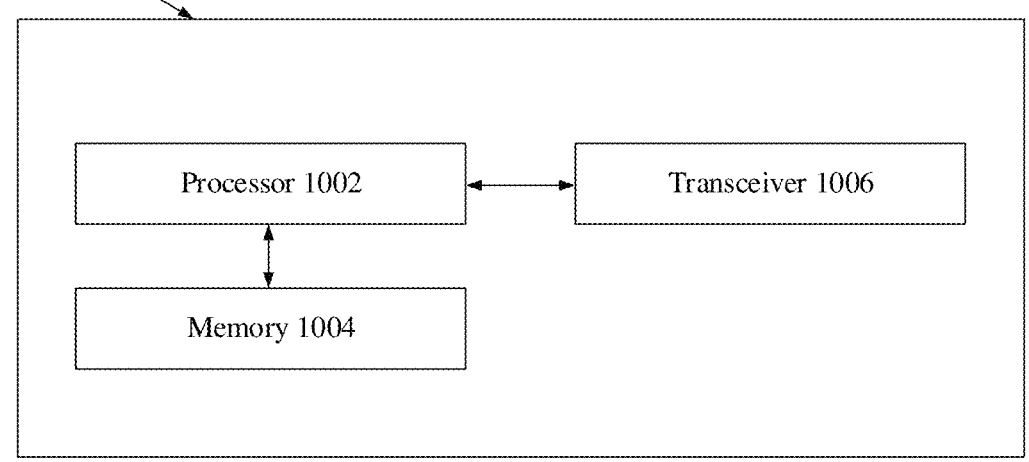
FIG. 12 is a structural schematic diagram of a computer device according to an implementation of the disclosure.

FIG. 12 is a structural schematic diagram of a computer device according to an embodiment of the disclosure. The computer device may be a terminal, and may also be a network device. As shown in FIG. 12, the computer device 100 may include one or more (only one is illustrated in the figure) processors 1002 (the processor 1002 may include, but not limited to, a processing device such as a Micro Control Unit (MCU) or a Field Programmable Gate Array (FPGA)), a memory 1004 configured to store data and a transceiver 1006 configured for a communication function. Those of ordinary skill in the art should know that the structure shown in FIG. 12 is only schematic and not intended to limit the structure of the electronic device. For example, the computer device 100 may further include components more or fewer than the components shown in FIG. 12 or has a configuration different from that shown in FIG. 12.

The memory 1004 may be configured to store a software program of application software and a module, for example, a program instruction/module corresponding to a method in the embodiments of the disclosure. The processor 1002 runs the software program and module stored in the memory 1004, thereby executing various functional applications and data processing, namely implementing the above-mentioned method. The memory 1004 may include a high-speed random access memory and may also include a nonvolatile memory, for example, one or more magnetic storage devices, flash memories or other nonvolatile solid-state memories. In some examples, the memory 1004 may further include a memory arranged remotely relative to the processor 1002 and the remote memory may be connected to the computer device 100 through a network. An example of the network includes, but not limited to, the Internet, an intranet, a local area network, a mobile communication network and a combination thereof.

The transceiver 1006 is configured to receive or send data through a network. A specific example of the network may include a wireless network provided by a communication provider of the computer device 100. In an example, the transceiver 1006 includes a Network Interface Controller (NIC), which may be connected with another network device through a base station, thereby communicating with the Internet. In an example, the transceiver 1006 may be a Radio Frequency (RF) module, configured to communicate with the Internet in a wireless manner.

The technical solutions recorded in the embodiments of the disclosure may be freely combined without conflicts.

In some embodiments provided by the disclosure, it is to be understood that the disclosed method and intelligent device may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, each functional unit in each embodiment of the disclosure may be integrated into a second processing unit, each unit may also serve as an independent unit and two or more than two units may also be integrated into a unit. The integrated unit may be implemented in a hardware form and may also be implemented in form of hardware and software functional unit.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure.

The invention claimed is:

1. A method for resource configuration, comprising:
receiving, by a terminal, first control information from a network device, a Band Width Part (BWP) currently activated by the terminal being a first BWP, the first control information comprising first indication information, and the first indication information being used to indicate that a BWP to-be-activated is a second BWP; and
determining, by the terminal, whether the first BWP and the second BWP are able to be activated simultaneously; and if the first BWP and the second BWP are able to be activated simultaneously, keeping, by the terminal, the first BWP to be continuously in an activated state during activating the second BWP;
wherein the method further comprises:
receiving, by the terminal, first configuration information from the network device, the first configuration information comprising first duration information corresponding to the first BWP and/or second duration information corresponding to the second BWP, the first duration information being used to enable, when an activated duration of the first BWP reaches a first duration, the terminal to deactivate the first BWP, and the second duration information being used to enable, when an activated duration of the second BWP reaches a second duration, the terminal to deactivate the second BWP; and
deactivating, by the terminal, the first BWP and/or the second BWP based on the first configuration information.

2. The method of claim 1, further comprising:
if the first BWP and the second BWP are disable to be activated simultaneously, deactivating, by the terminal, the first BWP during activating the second BWP.

3. The method of claim 1, wherein the determining, by the terminal, whether the first BWP and the second BWP are able to be activated simultaneously comprises:

if the first BWP and the second BWP satisfy a predetermined rule, determining, by the terminal, that the first BWP and the second BWP are able to be activated simultaneously; and if the first BWP and the second BWP do not satisfy a predetermined rule, determining, by the terminal, that the first BWP and the second BWP are disable to be activated simultaneously.

4. The method of claim 3, wherein the first BWP and the second BWP satisfy the predefined rule, which comprises:
a central frequency point and a bandwidth size of the first BWP are consistent with a central frequency point and a bandwidth size of the second BWP, respectively; or,
a frequency domain range of the second BWP is within a frequency domain range of the first BWP; or
a Radio Frequency (RF) bandwidth capacity of the terminal is able to simultaneously cover a frequency domain range of the first BWP and a frequency domain range of the second BWP.

5. The method of claim 1, wherein the determining, by the terminal, whether the first BWP and the second BWP are able to be activated simultaneously comprises:
receiving, by the terminal, second control information from the network device, the second control information comprising second indication information, and the second indication information indicating whether the first BWP and the second BWP are able to be activated simultaneously;
wherein the second control information is one of: Downlink Control Information (DCI), Radio Resource Control (RRC) signaling, or System Information (SI).

6. The method of claim 1, further comprising:
receiving, by the terminal, third control information from the network device, the third control information comprising third indication information, and the third indication information being used to indicate that a BWP to-be-deactivated is the first BWP and/or the second BWP; and
deactivating, by the terminal, the first BWP and/or the second BWP based on the third control information.

7. The method of claim 1, further comprising:
activating a default BWP when the first BWP and the second BWP are deactivated.

8. A method for resource configuration, comprising:
sending, by a network device, first control information to a terminal, a Band Width Part (BWP) currently activated by the terminal being a first BWP, the first control information comprising first indication information, and the first indication information being used to indicate that a BWP to-be-activated is a second BWP, so that the terminal keeps the first BWP to be continuously in an activated state during activating the second BWP when determining that the first BWP and the second BWP are able to be activated simultaneously;
wherein the method further comprises:
sending by the network device, first configuration information to the terminal device, the first configuration information comprising first duration information corresponding to the first BWP and/or second duration information corresponding to the second BWP, the first duration information being used to enable, when an activated duration of the first BWP reaches a first duration, the terminal to deactivate the first BWP, and the second duration information being used to enable, when an activated duration of the second BWP reaches a second duration, the terminal to deactivate the second BWP.

9. The method of claim 8, wherein if the first BWP and the second BWP are disable to be activated simultaneously, the first indication information is used to enable the terminal to deactivate the first BWP during activating the second BWP.

10. The method of claim 8, wherein whether the first BWP and the second BWP are able to be activated simultaneously comprises:
if the first BWP and the second BWP satisfy a predetermined rule, the first BWP and the second BWP are able to be activated simultaneously; and
if the first BWP and the second BWP do not satisfy a predetermined rule, the first BWP and the second BWP are disable to be activated simultaneously.

11. The method of claim 8, wherein the method further comprises:
sending, by the network device, second control information to the terminal, the second control information comprising second indication information, and the second indication information indicating whether the first BWP and the second BWP are able to be activated simultaneously;
wherein the second control information is one of Downlink Control Information (DCI), Radio Resource Control (RRC) signaling, or System Information (SI).

12. A device for resource configuration, comprising:
a transceiver, configured to receive first control information from a network device, a present activated Band Width Part (BWP) of a terminal being a first BWP, the first control information comprising first indication information, and the first indication information being used to indicate that a BWP to-be-activated is a second BWP;
a processor, configured to: determine whether the first BWP and the second BWP are able to be activated simultaneously; and keep, if the first BWP and the second BWP are able to be activated simultaneously, the first BWP to be continuously in an activated state during activating the second BWP; wherein
the transceiver is, further configured to receive first configuration information from the network device, the first configuration information comprising first duration information corresponding to the first BWP and/or second duration information corresponding to the second BWP, the first duration information being used to enable, when an activated duration of the first BWP reaches a first duration, the terminal to deactivate the first BWP, and the second duration information being used to enable, when an activated duration of the second BWP reaches a second duration, the terminal to deactivate the second BWP; and
the processor is further configured to deactivate the first BWP and/or the second BWP based on the first configuration information.

13. The device of claim 12, wherein the processor is further configured to deactivate, if the first BWP and the second BWP are disable to be activated simultaneously, the first BWP during activating the second BWP.

14. The device of claim 12, wherein the processor is configured to:
determine, if the first BWP and the second BWP satisfy a predetermined rule, that the first BWP and the second BWP are able to be activated simultaneously; and
determine, if the first BWP and the second BWP do not satisfy a predetermined rule, that the first BWP and the second BWP are disable to be activated simultaneously.

15. The device of claim 14, wherein the first BWP and the second BWP satisfy the predefined rule, which comprises:

a central frequency point and a bandwidth size of the first BWP are consistent with a central frequency point and a bandwidth size of the second BWP, respectively; or, a frequency domain range of the second BWP is within a frequency domain range of the first BWP; or a Radio Frequency (RF) bandwidth capacity of the terminal is able to simultaneously cover a frequency domain range of the first BWP and a frequency domain range of the second BWP.

16. The device of claim 12, wherein the transceiver is further configured to receive third control information from the network device, the third control information comprising third indication information, and the third indication information being used to indicate that a BWP to-be-deactivated is the first BWP and/or the second BWP; and the processor is further configured to deactivate the first BWP and/or the second BWP based on the third control information.

17. The device of claim 12, wherein the processor is further configured to activate a default BWP when the first BWP and the second BWP are deactivated.

* * * * *